United States Patent
Shionome

(10) Patent No.: US 12,017,666 B2
(45) Date of Patent: Jun. 25, 2024

(54) DRIVING ASSISTED VEHICLE CONTROL METHOD AND CONTROL SYSTEM

(71) Applicant: Nissan Motor Co., Ltd., Yokohama (JP)

(72) Inventor: Kouji Shionome, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 686 days.

(21) Appl. No.: 17/260,259

(22) PCT Filed: Jul. 16, 2018

(86) PCT No.: PCT/IB2018/000958
§ 371 (c)(1),
(2) Date: Jan. 14, 2021

(87) PCT Pub. No.: WO2020/016622
PCT Pub. Date: Jan. 23, 2020

(65) Prior Publication Data
US 2021/0300392 A1    Sep. 30, 2021

(51) Int. Cl.
*B60W 50/029*    (2012.01)
*B60W 10/18*    (2012.01)
(Continued)

(52) U.S. Cl.
CPC .......... *B60W 50/029* (2013.01); *B60W 10/18* (2013.01); *B60W 10/20* (2013.01);
(Continued)

(58) Field of Classification Search
CPC .... B60W 50/029; B60W 10/18; B60W 10/20; B60W 50/0205; B60W 50/14;
(Continued)

(56) References Cited

U.S. PATENT DOCUMENTS

| 8,099,179 B2 * | 1/2012 | Naik | G05B 9/03 |
| | | | 303/177 |
| 2014/0277608 A1 * | 9/2014 | Debouk | G05B 9/03 |
| | | | 700/79 |

FOREIGN PATENT DOCUMENTS

| DE | 10 2014 213 171 A1 | 10/2015 |
| JP | H10-76964 A | 3/1998 |

(Continued)

OTHER PUBLICATIONS

English Translation of Rink et al. (DE102014213171) (Year: 2014).*

*Primary Examiner* — James M McPherson
*Assistant Examiner* — Kyle J Kingsland
(74) *Attorney, Agent, or Firm* — Global IP Counselors, LLP

(57) ABSTRACT

In a driving assisted vehicle method for controlling a driving assisted vehicle, it is determined whether a failure has occurred in any one of a plurality of controllers. Upon determining that a failure has occurred in any one of the controllers, failure information is sent to a normal controller group other than a failed controller group to which the failed controller belongs via a network communication line. When the normal controller group receives the failure information via the network communication line, the controllers constituting the normal controller group executes a failure mode for backing up the operation function that is lost due to the failure until a driver returns to the operation.

10 Claims, 9 Drawing Sheets

(51) Int. Cl.
  *B60W 10/20* (2006.01)
  *B60W 50/02* (2012.01)
  *B60W 50/14* (2020.01)
  *G05D 1/00* (2024.01)
  *G07C 5/08* (2006.01)
  *H04L 67/12* (2022.01)

(52) U.S. Cl.
  CPC ........ *B60W 50/0205* (2013.01); *B60W 50/14* (2013.01); *G05D 1/0274* (2013.01); *G07C 5/0808* (2013.01); *G07C 5/0816* (2013.01); *B60W 2050/0292* (2013.01); *B60W 2420/403* (2013.01); *B60W 2420/408* (2024.01); *B60W 2420/54* (2013.01); *H04L 67/12* (2013.01)

(58) Field of Classification Search
  CPC ..... B60W 2050/0292; B60W 2420/42; B60W 2420/52; B60W 2420/54; B60W 50/023; B60R 16/0232; B60T 2270/413; G05D 1/0274; G07C 5/0808; G07C 5/0816; H04L 67/12
  See application file for complete search history.

(56) References Cited

FOREIGN PATENT DOCUMENTS

| | | |
|---|---|---|
| JP | 2014-101101 A | 6/2014 |
| JP | 2016-81534 A | 5/2016 |
| JP | 2016-181015 A | 10/2016 |
| JP | 2017-1611 A | 1/2017 |
| JP | 2018-062308 A | 4/2018 |
| WO | 2016/111340 A1 | 7/2016 |
| WO | 2016/194157 A1 | 12/2016 |
| WO | 2018/065973 A1 | 4/2018 |

* cited by examiner

DRIVING ASSISTED VEHICLE CONTROL METHOD AND CONTROL SYSTEM

CROSS-REFERENCE TO RELATED APPLICATIONS

This application is a U.S. national stage application of International Application No. PCT/IB2018/000958, filed on Jul. 16, 2018.

BACKGROUND

Technical Field

The present disclosure relates to a driving assisted vehicle control method and a control system for a driving assisted vehicle.

Background Information

Japanese Laid-Open Patent Application No. 2016-81534 (Patent Document 1) has the objective of providing a system capable of integrally controlling automated tasks in a vehicle and discloses a fail-safe E/E architecture for automated driving using the following solution. That is, a first calculation unit (1) has an interface for contacting at least one sensor (3) and at least one actuator (4). A second calculation unit (2) has an interface for contacting at least one sensor (3) and at least one actuator (4). The first calculation unit (1) and the second calculation unit (2) form a connection with each other via an interface (5). The first calculation unit (1) and/or the second calculation unit (2) and/or the actuator (4) are configured to determine whether the first or the second calculation unit (1, 2) can effectively drive and control the actuator (4).

SUMMARY

The fail-safe E/E architecture disclosed in Patent Document 1 is redundantly configured whereby even if one of the controllers fails, the same operation that was being conducted before the failure occurred can continue to be executed. Therefore, a control system must be configured that has a plurality of the same controllers and actuators.

In view of the problem described above, an object of the present disclosure is to realize, when a failure occurs in any one of a plurality of controllers installed in a vehicle, an operation function that is equivalent to the operation function that is lost due to the failure, without making the control system configuration redundant.

In order to realize the above-described object, the present disclosure is a method for controlling a driving assisted vehicle provided with a plurality of controllers that share operation functions in a driving assist control. Based on an architecture that realizes equivalent operation functions with each controller group, a plurality of controllers are divided into a plurality of controller groups to construct a network topology. The control method according to this network topology is as follows. It is determined whether a failure has occurred in any one of a plurality of controllers. Upon determining that a failure has occurred in any one of the plurality of controllers, failure information is sent to a normal controller group other than the failed controller group to which the failed controller belongs via a network communication line. When the normal controller group receives the failure information via the network communication line, the controllers constituting the normal controller group execute a failure mode for backing up the operation function of the failed controller group.

As a result, if a failure occurs in any one of a plurality of controllers installed in a vehicle, it is possible to realize an operation function that is equivalent to the operation function that is lost due to the failure without using a redundantly configured control system.

BRIEF DESCRIPTION OF THE DRAWINGS

Referring now to the attached drawings which form a part of this original disclosure.

DETAILED DESCRIPTION OF EMBODIMENTS

Figure 1:
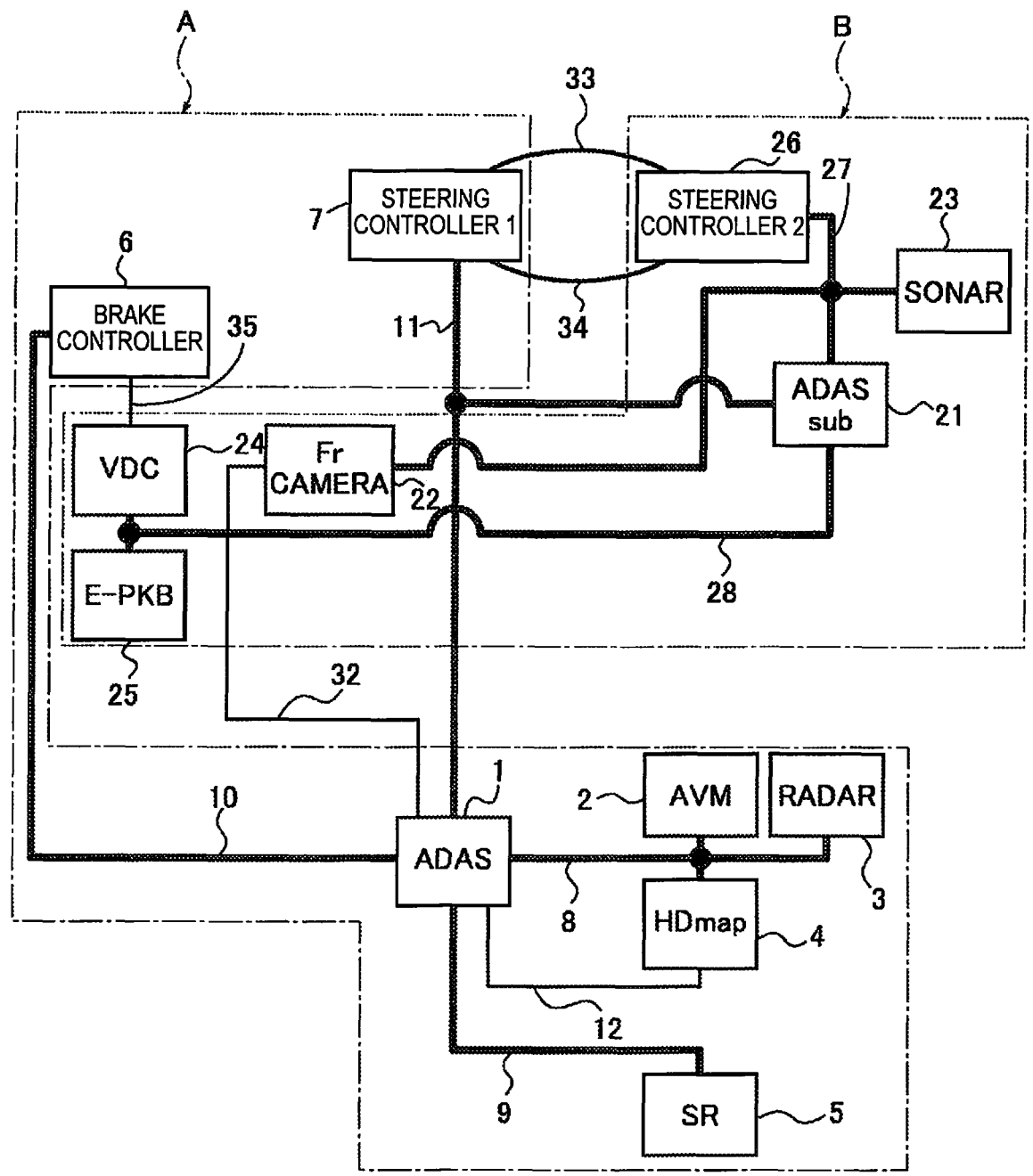
FIG. 1 is an overall control system diagram illustrating a network topology in which a plurality of controllers installed in an autonomous driving vehicle, to which a control method and a control system of the first embodiment are applied, are divided into a first controller group and a second controller group.

An embodiment for achieving a control method and a control device for a driving assisted vehicle according to the present disclosure will be described below based on a first embodiment illustrated in the drawings.

First Embodiment

The control method and the control system according to the first embodiment are applied to an autonomous driving vehicle (one example of a driving assisted vehicle) that realizes autonomous driving in a single lane on a dedicated road for automobiles. An "overall control system configuration" and a "fail-safe control system configuration" will be described separately below regarding the configuration of the first embodiment.

Overall System Configuration

FIG. 1 illustrates a network topology in which a plurality of controllers installed in an autonomous driving vehicle to which the control method and the control system of the first embodiment are applied are divided into a first controller group A and a second controller group B. The overall system configuration will be described with reference to FIG. 1.

The autonomous driving vehicle is an electrically driven vehicle that realizes autonomous driving in a single lane on a dedicated road for automobiles when an autonomous driving mode is selected. For example, if lane deviation is detected during travel while the autonomous driving mode is selected, steering is controlled so as to effect travel in the vicinity of the center of the travel lane, thereby assisting a driver's steering operation. During travel while the autonomous driving mode is selected, inter-vehicular space control is carried out such that, when a preceding vehicle is not detected, the vehicle travels at a vehicle speed set by the driver, and when a preceding vehicle is detected, the vehicle maintains an inter-vehicular distance corresponding to the vehicle speed, with the vehicle speed set by the driver as the upper limit. When stopping occurs during a preceding vehicle following travel on a congested road, or the like, brake control using VDC is carried out, and if there is a request to continue the stopped state, an electric parking brake is activated. In this manner, the autonomous driving vehicle is equipped with technology that supports all of the following: steering wheel operation assistance, acceleration/deceleration adjustment of the vehicle speed, and parking/stopping.

A plurality of controllers installed in the autonomous driving vehicle have an actuator operation function and a host vehicle periphery recognition operation function in the autonomous driving control to realize the operating functions that are required by using all of the controllers when in the normal mode. Then, based on an architecture that realizes equivalent operation functions with each controller group, a plurality of controllers are divided into a first controller group A and a second controller group B to construct a network topology. Here, "network topology" refers to a configuration in which a plurality of controllers are grouped based on a design concept of realizing equivalent operation functions with each of the first controller group A and the second controller group B, which are connected to each other using network communication lines.

The network communication lines/power sources of the first controller group A and the second controller group B are electrically and physically independent. That is, if a failure occurs in a controller included in one controller group, the operation function of the failed controller group can be ensured by backing up a controller included in the other controller group.

As shown in FIG. 1, the controllers provided in the first controller group A include an ADAS controller 1, an AVM controller 2, a RADAR controller 3, an HDmap controller 4, and an SR controller 5. In addition, a brake controller 6 (e.g., an eACT controller) and a first steering controller 7 (e.g., an StBW1 controller) are provided.

As shown in FIG. 1, the network communication lines of the first controller group A include a first CAN communication line 8, a second CAN communication line 9, a third CAN communication line 10, a fourth CAN communication line 11, and a first LAN communication line 12.

That is, the first CAN communication line 8 connects the ADAS controller 1, the AVM controller 2, the RADAR controller 3, and the HDmap controller 4. The second CAN communication line 9 connects the ADAS controller 1 and the SR controller 5. The third CAN communication line 10 connects the ADAS controller 1 and the brake controller 6. The fourth CAN communication line 11 connects the ADAS controller 1 and the first steering controller 7. Then, the first LAN communication line 12 connects the ADAS controller 1 and the HDmap controller 4.

The ADAS controller 1 is a controller that integrally handles information processing in the first controller group A, including fail-safe control, in an advanced driving assistance system that assists the driving operation of the driver. In this ADAS controller 1, high-precision map information from the HDmap controller 4 and host vehicle position information from an unillustrated GPS are the inputs. Then, if lane deviation is detected during travel along a single lane while the autonomous driving mode is selected, a control command to correct the steering is output to the first steering controller 7. In addition, if during travel a preceding vehicle cuts in ahead along a single lane and it is determined that deceleration of the host vehicle is required in order to maintain an inter-vehicular distance from the preceding vehicle, a control command to decelerate the host vehicle to the required vehicle speed is output to the brake controller 6. "ADAS" is an acronym for "Advanced driver-assistance system."

The AVM controller 2 shares a function for recognizing obstacles present around the entire periphery of the host vehicle, parking frames and travel lanes indicated by white lines drawn on the road, and the like, based on camera image data, in a host vehicle periphery recognition system (omni-directional monitoring system). In the AVM controller 2, image data from on-board cameras installed oriented in four directions (front, rear, left, and right) are input to carry out image processing; and upon determining that an obstacle is present around the periphery of the host vehicle, the distance from the host vehicle to the obstacle is calculated. Then, obstacle position information of the periphery of the host vehicle and the distance information to the obstacle are output to the ADAS controller 1. "AVM" is an acronym for "Around View Monitor."

The RADAR controller 3 shares a function to recognize a forward obstacle that is present in an area ahead of the host vehicle based on radar echo in the host vehicle periphery recognition system (front radar system). In the RADAR controller 3, sensor signals from a front radar installed oriented in the forward direction of the host vehicle are input, and upon determining that a forward obstacle is present in the area ahead of the host vehicle, the distance from the host vehicle to the forward obstacle is calculated. Then, forward obstacle position information and the distance information to the forward obstacle are output to the ADAS controller 1.

The HDmap controller 4 extracts map data centered at the host vehicle position from an on-board memory in which electronic map data is stored, when the host vehicle position is recognized using a GPS, and outputs the extracted map data to the ADAS controller 1. Here, "HD map" refers to a high-precision map composed of more detailed road information (for example, type of road, lane width, road shape) compared to a GPS map.

The SR controller 5 shares a function to recognize a lateral obstacle that is present in areas on the left and right sides of the host vehicle based on radar echo in the host vehicle periphery recognition system (side radar system). In the SR controller 5, sensor signals from side radars installed facing sideward from the host vehicle are input, and upon determining that a lateral obstacle is present in the side area of the host vehicle, the distance from the host vehicle to the lateral obstacle is calculated. Then, lateral obstacle position information and the distance information to the lateral obstacle are output to the ADAS controller 1. The side radars are respectively installed in a front left side position, a rear left side position, a front right side position, and a rear right side position, for example.

The brake controller 6 shares a brake actuator operation function that uses an electric booster interposed between a brake pedal and a master cylinder, in an in-vehicle brake control system. In the brake controller 6, when a deceleration control command is input from the ADAS controller 1, a control command to decelerate the vehicle to the required vehicle speed is output to the motor of the electric booster.

The first steering controller 7 shares a steering actuator operation function that uses a first steering motor provided in a tire steering system of a steer-by-wire structure, in an in-vehicle steering control system. In this first steering controller 7, when a control command to correct the steering is input from the ADAS controller 1, a command to set a target turning correction amount is output to the first steering motor. Here, "StBW" refers to a steer-by-wire system in which the steering wheel operation system and the tire steering system can be mechanically separated via a steering clutch.

Here, a steer-by-wire structure can be separated into a steering wheel operation system and a tire steering system using a steering clutch. In addition, the structure has an "SBW mode" in which the steering clutch is released and an "EPS mode (electric power steering mode)" in which the steering clutch is engaged. The steering wheel operation system has a reaction force motor for imparting a steering reaction force to the steering wheel when the "SBW mode" is selected. The tire steering system includes the first steering motor that turns the tires when the "SBW mode" is selected and a second steering motor that imparts an assist torque to the steering system when the "EPS mode" is selected.

As shown in FIG. 1, the controllers provided in the second controller group B are an ADAS sub-controller 21, an FrCAMERA controller 22, and a SONAR controller 23. In addition, a VDC controller 24, an E-PKB controller 25, and a second steering controller 26 (e.g., an STBW2 controller) are provided.

As shown in FIG. 1, the network communication lines of the second controller group B are a fifth CAN communication line 27 and a sixth CAN communication line 28.

That is, the fifth CAN communication line 27 connects the ADAS sub-controller 21, the FrCAMERA controller 22, the SONAR controller 23, and the second steering controller 26. The sixth CAN communication line 28 connects the ADAS sub-controller 21, the VDC controller 24, and the E-PKB controller 25.

The ADAS sub-controller 21 integrally handles information processing in the second controller group B, including fail-safe control, in the advanced driving assistance system that assists the driving operation of the driver. Inputs to the ADAS sub-controller 21 include travel lane and obstacle information from the FrCAMERA controller 22 and obstacle information from the SONAR controller 23. Upon determining that it is necessary to avoid an obstacle during travel along a single lane while the autonomous driving mode is selected, a brake fluid pressure command for avoiding the obstacle using deceleration behavior of the host vehicle is output to the VDC controller 24. In addition, if a prescribed period of time has elapsed in a stopped state and it is determined that it is necessary to place the vehicle in a parked state, a parking operation command is output to the E-PKB controller 25. When it is determined that a steering assist force is required during travel while the "EPS mode" is selected, a control command to impart an assist torque to the steering system is output to the second steering controller 26.

The FrCAMERA controller 22 shares a function for recognizing obstacles present in the area ahead of the host vehicle, travel lanes indicated by white lines drawn on the road, and the like, based on camera image data, in a host vehicle periphery recognition system (front camera system). In the FrCAMERA controller 22, image data from a front camera installed facing in the front direction of the host vehicle are input to carry out image processing, and upon determining that an obstacle is present in front of the host vehicle, the distance between the host vehicle and the forward obstacle is calculated. Then, forward obstacle position data and distance-to-forward-obstacle data are output to the ADAS sub-controller 21.

The SONAR controller 23 shares a function for recognition of an obstacle that is present around the periphery of the host vehicle based on sonar echo (sound waves) in the host vehicle periphery recognition system (on-board sonar system). In the SONAR controller 23, sensor signals from sonars installed facing sideward from the host vehicle are input, and upon determining that a lateral obstacle is present in the side area of the host vehicle, the distance from the host vehicle to the lateral obstacle is calculated. Then, lateral obstacle position data and distance-to-lateral-obstacle data are output to the ADAS sub-controller 21.

The VDC controller 24 is interposed between the master cylinder and a wheel cylinder and shares a brake actuator operation function that uses a brake fluid pressure actuator with four-wheel independent control, in an in-vehicle brake control system. In the VDC controller 24, when a brake fluid pressure command is input from the ADAS sub-controller 21, a command for producing deceleration avoidance behavior of the host vehicle to avoid the obstacle is output to the brake fluid pressure actuator. "VDC" is an acronym for "Vehicle Dynamics Control."

The E-PKB controller 25 shares a brake actuator operation function that uses a parking actuator included in a parking brake mechanism provided at a location of a transmission output shaft, in an in-vehicle brake control system.

In the E-PKB controller 25, when a parking operation command is input from the ADAS sub-controller 21, a command to lock the parking brake mechanism using a mechanical engagement is output to a PKB actuator.

The second steering controller 26 shares a steering actuator operation function that uses a second steering motor provided in a tire steering system of a steer-by-wire structure, in an in-vehicle steering control system. In the second steering controller 26, when a steering assist command is input from the ADAS sub-controller 21, a control command to provide assist torque to the steering system is output to the second steering motor.

As shown in FIG. 1, the network communication lines that connect the first controller group A and the second controller group B are the fourth CAN communication line 11, a second LAN communication line 32, a third LAN communication line 33, a fourth LAN communication line 34, and a fifth LAN communication line 35.

That is, the fourth CAN communication line 11 is branched and extends to the ADAS sub-controller 21, to thereby connect the ADAS controller 1 and the ADAS sub-controller 21. The second LAN communication line 32 connects the ADAS controller 1 and the FrCAMERA controller 22. The third LAN communication line 33 and the fourth LAN communication line 34 connect the first steering controller 7 and the second steering controller 26. The fifth LAN communication line 35 connects the brake controller 6 and the VDC controller 24.

Fail-Safe Control System Configuration

Figure 2:
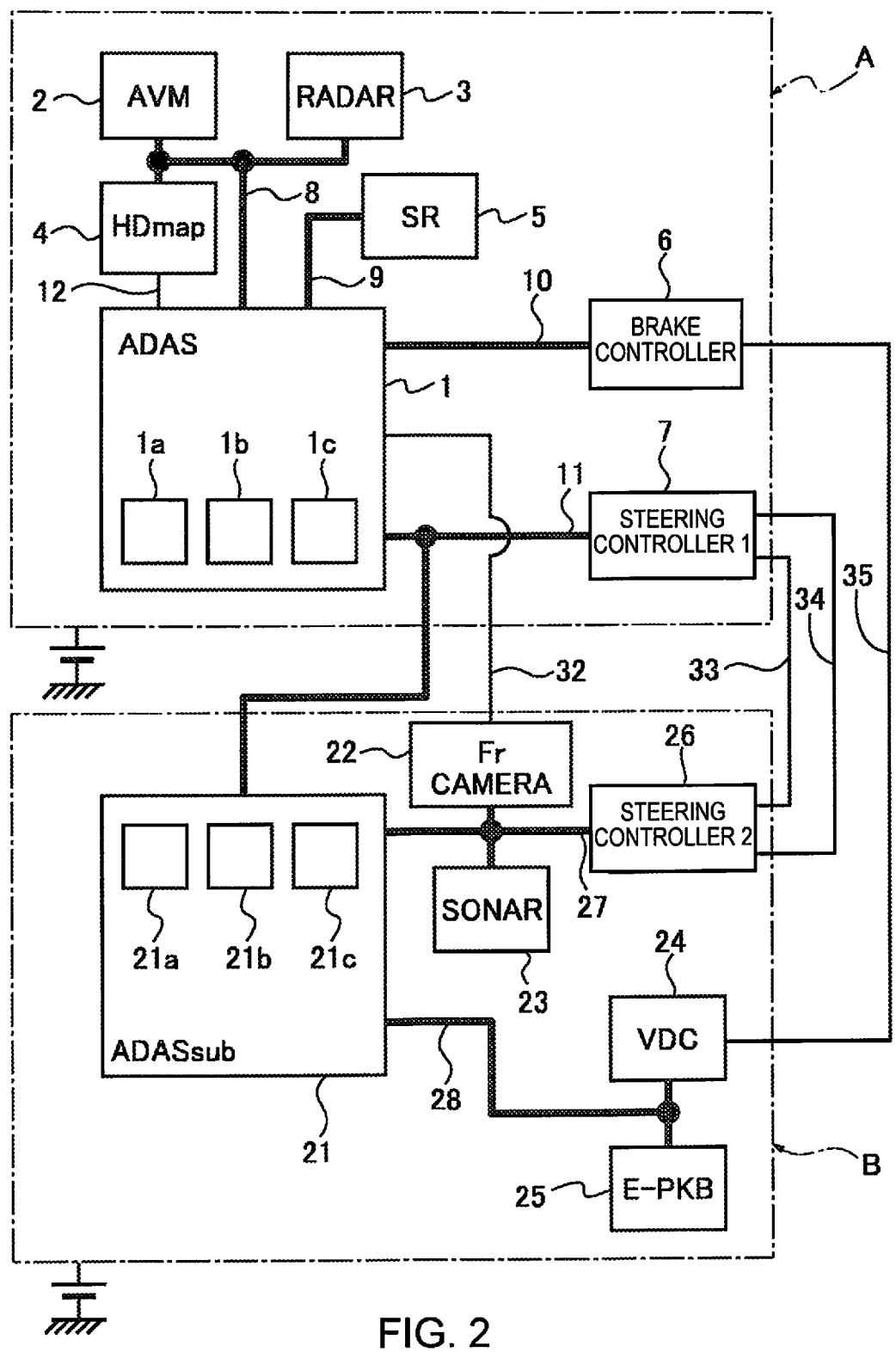
FIG. 2 is a control block diagram illustrating a fail-safe control system configuration composed of an ADAS controller included in the first controller group and an ADAS sub-controller included in the second controller group, from among the plurality of controllers.

FIG. 2 illustrates a fail-safe control system configuration composed of the ADAS controller 1 included in the first controller group A and the ADAS sub-controller 21 included in the second controller group B, from among the plurality of controllers. The configuration of the fail-safe control system will be described below with reference to FIG. 2.

As shown in FIG. 2, the ADAS controller 1 includes a failure determination unit 1a, a failure information transmission unit 1b, and a fail-safe control unit 1c. Similarly, as shown in FIG. 2, the ADAS sub-controller 21 includes a failure determination unit 21a, a failure information transmission unit 21b, and a fail-safe control unit 21c.

The failure determination unit 1a determines whether a failure has occurred in any one of the plurality of controllers 1, 2, 3, 4, 5, 6, 7 included in the first controller group A while the autonomous driving mode is selected. Similarly, failure determination unit 21a determines whether a failure has occurred in any one of the plurality of controllers 21, 22, 23, 24, 25, 26 included in the second controller group B while the autonomous driving mode is selected.

Here, in the case of the first controller group A, each of the plurality of controllers 1, 2, 3, 4, 5, 6, 7 has a self-diagnostic function, and if a failure has occurred according to the self-diagnosis, outputs a failure flag to the failure determination unit 1a. Here, unless a failure flag is input, the failure determination unit 1a determines that all of the controllers 1, 2, 3, 4, 5, 6, 7 are normal. On the other hand, if a failure flag is input, it is determined that a failure has occurred in the controller specified by the flag. The same applies to the failure determination unit 21a; a failure flag is input from the plurality of controllers 21, 22, 23, 24, 25, 26 included in the second controller group B.

Upon determining that a failure has occurred in any one of the plurality of controllers 1, 2, 3, 4, 5, 6, 7, the failure information transmission unit 1b transmits the failure information from the ADAS controller 1 to the fail-safe control unit 21c of the ADAS sub-controller 21 via the fourth CAN communication line 11. Similarly, upon determining that a failure has occurred in any one of the plurality of controllers 21, 22, 23, 24, 25, 26, the failure information transmission unit 21b transmits the failure information from the ADAS sub-controller 21 to the fail-safe control unit 1c of the ADAS controller 1 via the fourth CAN communication line 11.

Here, upon determining by the failure information transmission unit 1b or the failure information transmission unit 21b that a failure has occurred, in addition to transmitting the failure information, notification information is output which notifies and informs the driver, visually (displayed on a display) or audibly (alarm sound), that a failure has occurred.

If a failure occurs in a controller included in the second controller group B, the fail-safe control unit 1c receives failure information from the failure information transmission unit 21b of the ADAS sub-controller 21 via the fourth CAN communication line 11. When the failure information is received, the controllers constituting the first controller group A execute the failure mode for backing up the operation function of the second controller group B (failed controller group) until the driver returns to the operation. Similarly, when a failure occurs in a controller that is a constituent of the first controller group A, the fail-safe control unit 21c receives the failure information from the failure information transmission unit 1b of the ADAS controller 1 via the fourth CAN communication line 11. When the failure information is received, the controllers constituting the second controller group B execute a failure mode for backing up the operation function of the first controller group A (failed controller group) until the driver restores operation.

Upon determining that a failure has not occurred in any of the plurality of on-board controllers 1-7, 21-26, normal mode is executed, wherein the operation functions are realized using all of the plurality of controllers 1-7, 21-26.

Examples of the fail-safe control executed by the fail-safe control unit 1c or the fail-safe control unit 21c will be listed below.

(a) In the case that the operation function is the steering actuator operation function that is lost due to the failure of the first steering controller 7 (first steering controller) and the second steering controller 26 (second steering controller), the controller included in the normal controller group is used. Then, failure modes 1, 2 for backing up the steering actuator operation function that is lost due to the failure are executed.

(b) In the case that the operation function is the brake actuator operation function that is lost due to the failure of the brake controller 6 (first brake controller), the VDC controller 24, and the E-PKB controller 25 (second brake controller), the controller included in the normal controller group is used. Then, the failure modes 1, 2 are executed for backing up the brake actuator operation function that is lost due to the failure.

(c) In the case that the operation function is the travel lane recognition operation function of the host vehicle that is lost due the failure of the HDmap controller 4 (the first travel lane recognition controller) and the FrCAMERA controller 22 (the second travel lane recognition controller), the controller included in the normal controller group is used. Then, failure modes 1, 2, for backing up the travel lane recognition operation function of the host vehicle that is lost due to the failure are executed.

(d) In the case that the operation function is the forward obstacle recognition operation function of the host vehicle that is lost due to the failure of the RADAR controller 3 (first forward obstacle recognition controller) and the FrCAM- ERA controller 22 (second forward obstacle recognition controller), the controller included in the normal controller group is used. Then, failure modes 1, 2 for backing up the forward obstacle recognition operation function of the host vehicle that is lost due to the failure are executed.

(e) In the case that the operation function is a lateral obstacle recognition operation function of the host vehicle that is lost due to the failure of the SR controller 5 (first lateral obstacle recognition controller) and the SONAR controller 23 (second lateral obstacle recognition controller), the controller included in the normal controller group is used. Then, failure modes 1, 2 for backing up the lateral obstacle recognition operation function of the host vehicle that is lost due to the failure are executed.

The operations of the first embodiment will be described separately as the "fail-safe control operation when the on-board controller fails," the "normal/failure mode operation in the steering control system," and the "normal/failure mode operation in the brake control system." In addition, the "normal/failure mode operation in the travel lane recognition control system," the "normal/failure mode operation in the forward obstacle recognition control system," and the "normal/failure mode operation in the lateral obstacle recognition control system" will be described separately.

Fail-Safe Control Operation when the On-Board Controller Fails

A driving assisted vehicle equipped with a plurality of controllers sharing operating functions of driving assist control, redundantly configured to perform, in the event of failure, the same controller operation that was conducted before the failure, will be used as a comparative example. Here, "redundantly configured" refers to a configuration in which a plurality of control systems are prepared so that the operating functions can be continued even in the event of failure of a part of the control system.

In the case of the comparative example, although a backup function that is equivalent to that of the normal state is ensured at the time of a failure, the number of sensors, controllers, and actuators become large due to the redundant configuration. In particular, if the number of on-board controllers becomes large, as is the case with autonomous driving vehicles in which it is necessary to realize more numerous operation functions as the level of autonomous driving increases, adopting a redundant configuration results in an enormous number of sensors, controllers, and actuators.

On the other hand, in the case of a driving assisted vehicle which assists the driver's driving, for example, at least a part of the accelerator operation, braking operation, and steering operation is entrusted to the on-board controller during travel. For this reason, fail-safe control during a failure is indispensable, so that there is a demand for constantly ensuring a backup function in preparation for the occurrence of a failure.

The present inventors focused attention on the aforementioned problems and requirements and designated the securing of a backup function in the event of failure without the adoption of a redundant configuration as the problem to be solved. Then, as a means for solving this problem, the following was employed: based on an architecture that realizes equivalent operation functions with each controller group, a plurality of controllers are divided into a plurality of controller groups to construct a network topology. Then, if a failure occurs in any one of the plurality of controllers, the controllers that constitute the normal controller group to which the failed controller does not belong back up the operation function of the failed controller group to which the failed controller belongs.

That is, if a failure occurs in an on-board controller, it is desired to retain an equivalent operation function in some form, even if the performance is slightly reduced. For example, it is assumed that an electric booster that carries out boost control and a brake fluid pressure actuator that carries out VDC control are provided as brake actuators for the braking operation function of "stop." Among such vehicles, there are those in which, for example, if the electric booster fails, "stop" is realized using the brake fluid pressure actuator, which carries out VDC control, even though it is an actuator in which the braking precision is low compared to the electric booster.

The fail-safe control operation when the autonomous driving mode is selected will be described below based on FIG. 3.

It is determined whether the autonomous driving mode is selected (S1). Upon determining that the autonomous driving mode is not selected, the determination of S1 is repeated.

Upon determining that the autonomous driving mode is selected in S1, it is determined whether a failure has occurred in any one of the on-board controllers (S2). Upon determining that a failure has not occurred in any of the controllers, normal mode is executed (S3) and the process flow from S1→S2→S3 is repeated. In normal mode all of the on-board controllers that share the actuator operation functions and the host vehicle periphery recognition operation functions are used to cause the vehicle to travel along a single lane in the autonomous driving mode, at the same time supporting the steering wheel operation assistance, acceleration/deceleration adjustment of the vehicle speed, and stopping/parking.

On the other hand, upon determining that a failure has occurred in any one of the on-board controllers in S2, the failed controller group to which the failed controller belongs and the normal controller group to which the failed controller does not belong are specified (S4). Then, failure information (including the failed operation function information) is transmitted from the failed controller group to the normal controller group via the fourth CAN communication line 11 (S5). At the same time, notification information, which notifies the driver that a failure has occurred, is output (S6).

When the normal controller group receives the failure information via the fourth CAN communication line 11, the controller included in the normal controller group is used to execute a failure mode 1 or a failure mode 2 for backing up the operation function that is lost due to the failure (S7).

Subsequent to S7, it is determined whether the driver has returned to the operation (S8). Then, while it is being determined that the driver has not returned to the operation, a process flow that progresses from S6→S7→S8 is repeated, and the output of the notification information, which notifies the driver that a failure has occurred, and the execution of the failure mode 1 or the failure mode 2 are continued. Thereafter, when it is determined that the driver has returned to the operation, the process proceeds from S8 to S9, the autonomous driving mode is shifted to a manual driving mode in S9, and the fail-safe control operation when the autonomous driving mode is selected is ended.

Here, the driver returning to the operation is determined by, for example, detecting that the driver has applied a steering force to the steering wheel with a torque sensor provided in the steering system.

In this manner, when it is determined that a failure has occurred in any one of the on-board controllers, the failure mode 1 or the failure mode 2 for backing up the operation function that is lost due to the failure is executed until the driver returns to the operation. As a result, when a failure occurs in any one of a plurality of controllers installed in a vehicle, it is possible to realize an operation function that is equivalent to the operation function that was lost due to the failure, without making the control system configuration redundant.

Normal/Failure Mode Operation in the Steering Control System

The normal/failure mode operation in the steering control system will be described below based on FIGS. 4 to 6.

Figure 4:
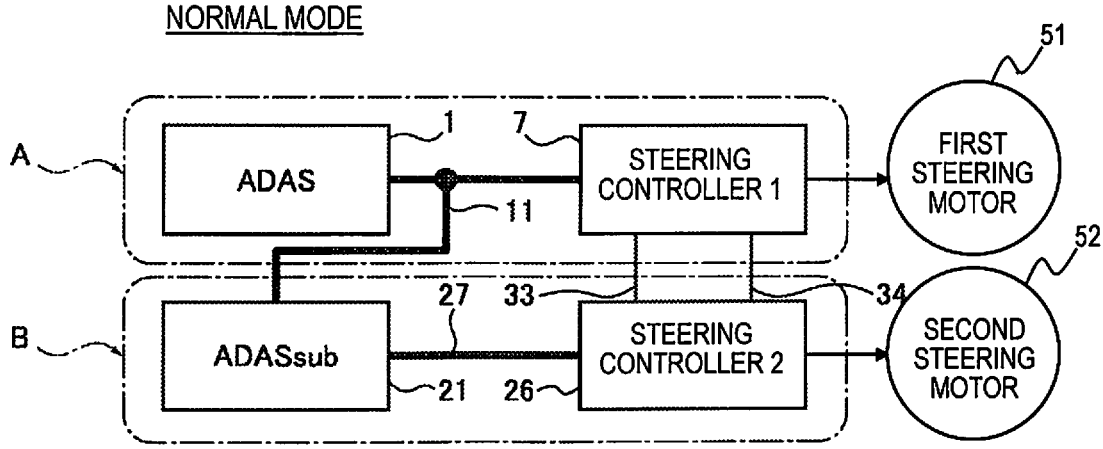
FIG. 4 is an operation explanatory view illustrating a normal mode of a steering control system that shares steering actuator operation function.

As shown in FIG. 4, the first controller group A has, as the steering control system, the ADAS controller 1 and the first steering controller 7 (the first steering controller) that controls the first steering motor 51 (the first steering actuator). As shown in FIG. 4, the second controller group B has, as the steering control system, the ADAS sub-controller 21 and the second steering controller 26 that controls the second steering motor 52 (the second steering actuator).

As shown in FIG. 4, in the normal mode of the steering control system, all of the ADAS controller 1, the first steering controller 7, the ADAS sub-controller 21, and the second steering controller 26 are used to share the steering actuator operation function.

It will be assumed that a failure has occurred in the steering control system provided in the second controller group B. Here, "failure in the steering control system provided in the second controller group B" includes not only failures of the ADAS sub-controller 21 and the second steering controller 26 themselves, but also connector failures, communication failures, actuator failures, and the like. That is, it includes all causes that may result in a malfunction of the steering actuator operation function in the second controller group B.

Figure 5:
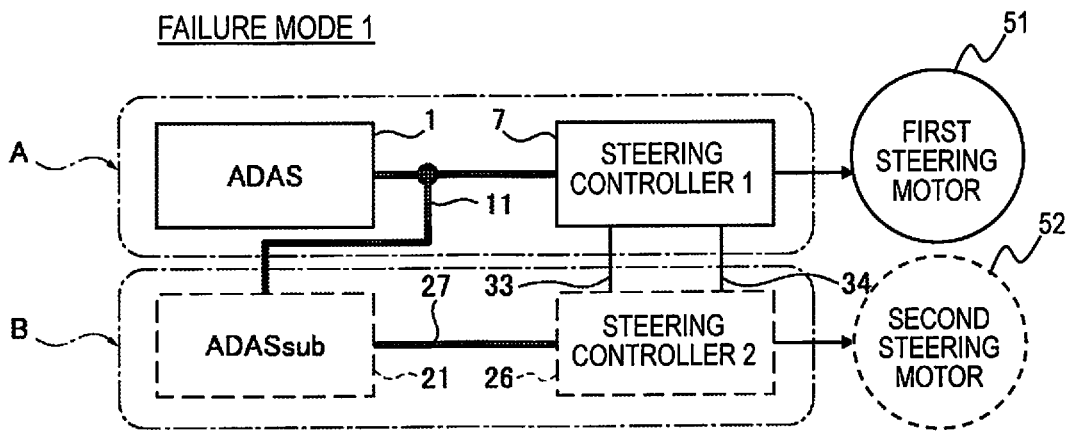
FIG. 5 is an operation explanatory view illustrating a failure mode 1 in the steering control system.

In this case, as shown in FIG. 5, failure mode 1 is executed, in which the ADAS controller 1 and the first steering controller 7 included in the first controller group A, which is the normal controller group, are used to back up the steering actuator operation function that is lost due to the failure.

It will be assumed that a failure has occurred in the steering control system provided in the first controller group A. Here, "failure in the steering control system provided in the first controller group A" includes not only failures of the ADAS controller 1 and the first steering controller 7 themselves, but also connector failures, communication failures, actuator failures, and the like. That is, it includes all causes that may result in a malfunction of the steering actuator operation function in the first controller group A.

Figure 6:
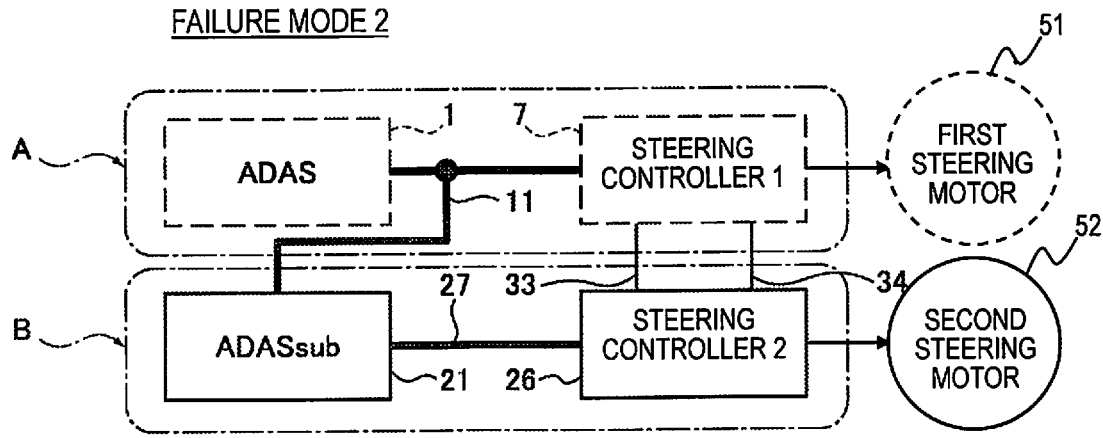
FIG. 6 is an operation explanatory view illustrating a failure mode 2 in the steering control system.

In this case, as shown in FIG. 6, failure mode 2 is executed, in which the ADAS sub-controller 21 and the second steering controller 26 included in the second controller group B, which is the normal controller group, are used to back up the steering actuator operation function that is lost due to the failure.

Normal/Failure Mode Operation in the Brake Control System

The normal/failure mode operation in the brake control system will be described below based on FIGS. 7 to 9.

Figure 7:
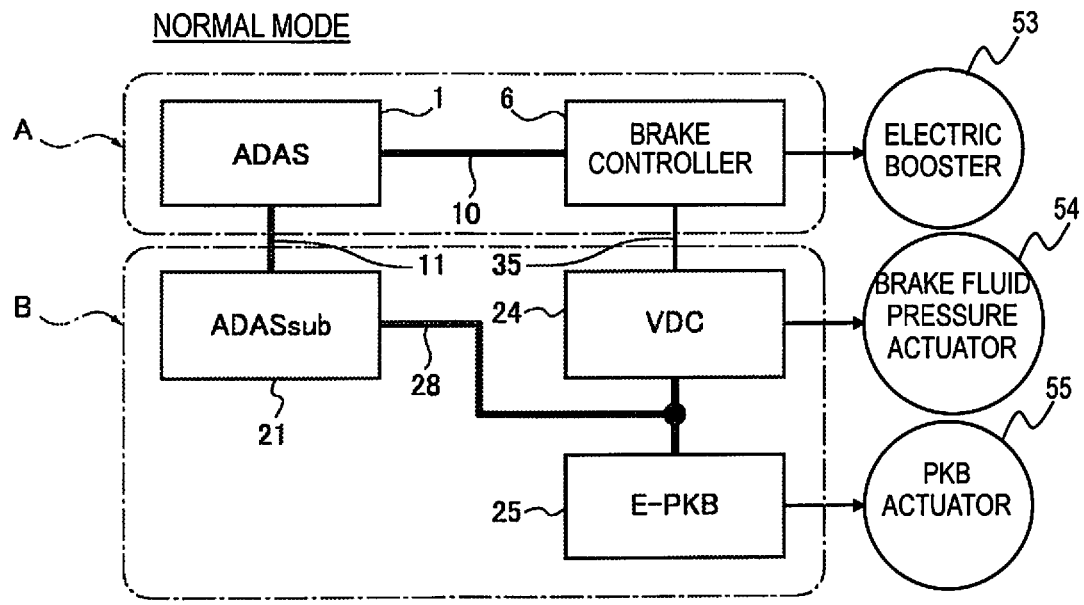
FIG. 7 is an operation explanatory view illustrating a normal mode of a brake control system that shares a brake actuator operation function.

As shown in FIG. 7, the first controller group A has, as the brake control system, the ADAS controller 1 and the brake controller 6 that controls an electric booster 53. As shown in FIG. 7, the second controller group B has, as the brake control system, the ADAS sub-controller 21, the VDC controller 24 that controls a brake fluid pressure actuator 54, and the E-PKB controller 25 that controls a PKB actuator 55. The electric booster 53 corresponds to a first brake actuator, and the brake controller 6 corresponds to the first brake controller. The brake fluid pressure actuator 54 and the PKB actuator 55 correspond to a second brake actuator, and the VDC controller 24 and the E-PKB controller 25 correspond to the second brake controller.

As shown in FIG. 7, in the normal mode of the brake control system, the ADAS controller 1, the brake controller 6, the ADAS sub-controller 21, the VDC controller 24, and the E-PKB controller 25 are all used to share the brake actuator operation function.

It will be assumed that a failure has occurred in the brake control system provided in the second controller group B. Here, "failure in the brake control system provided in the second controller group B" includes not only failures of the ADAS sub-controller 21, the VDC controller 24, and the E-PKB controller 25 themselves, but also connector failures, communication failures, actuator failures, and the like. That is, it includes all cause that may result in a malfunction of the brake actuator operation function in the second controller group B.

Figure 8:
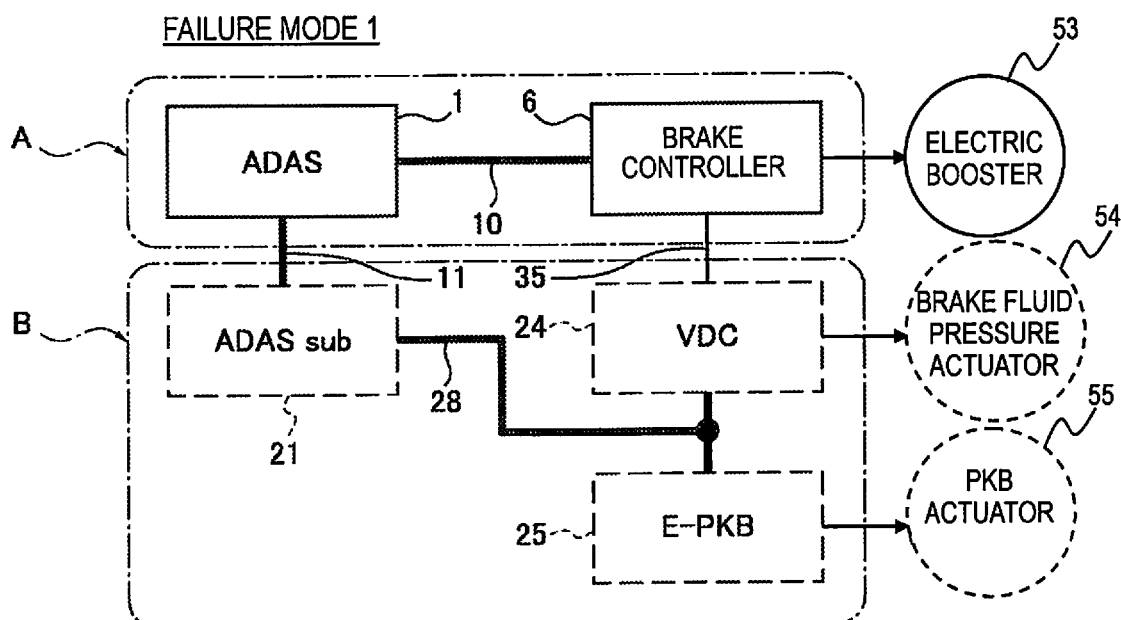
FIG. 8 is an operation explanatory view illustrating a failure mode 1 in the brake control system.

In this case, as shown in FIG. 8, failure mode 1 is executed, in which the ADAS controller 1 and the brake controller 6 included in the first controller group A, which is the normal controller group, are used to back up the steering actuator operation function that is lost due to the failure.

It will be assumed that a failure has occurred in the brake control system provided in the first controller group A. Here, "failure in the brake control system provided in the first controller group A" includes not only failures of the ADAS controller 1 and the brake controller 6 themselves, but also connector failures, communication failures, actuator failures, and the like. That is, it includes all causes that may result in a malfunction of the brake actuator operation function in the first controller group A.

Figure 9:
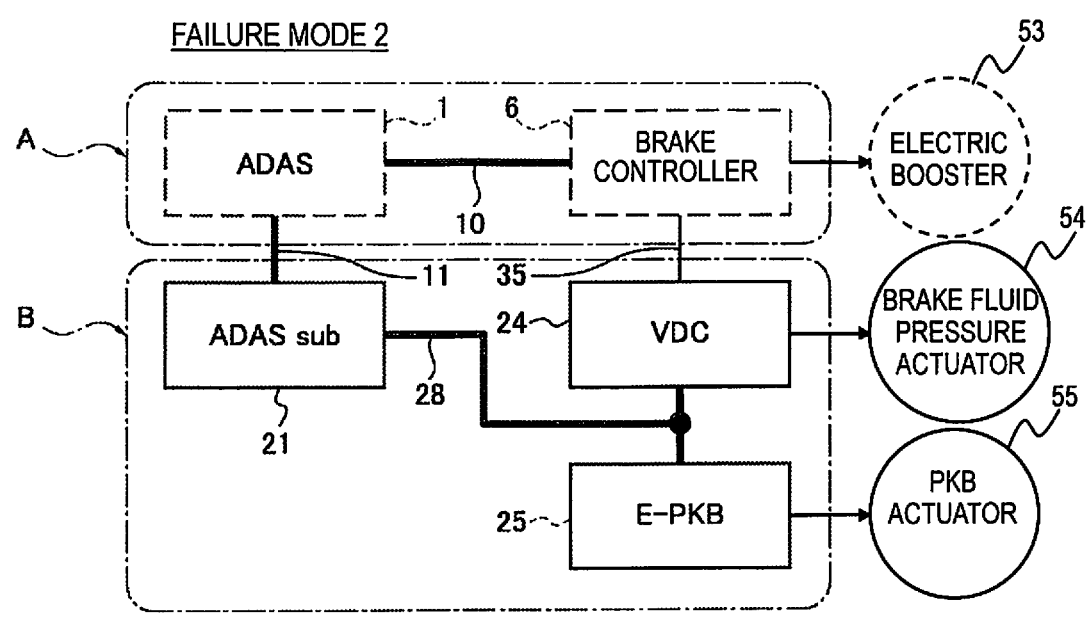
FIG. 9 is an operation explanatory view illustrating a failure mode 2 in the brake control system.

In this case, as shown in FIG. 9, the failure mode 2 is executed, in which the ADAS sub-controller 21, the VDC controller 24, and the E-PKB controller 25 included in the second controller group B, which is the normal controller group, are used to back up the brake actuator operation function that is lost due to the failure.

Normal/Failure Mode Operation in the Travel Lane Recognition Control System

The normal/failure mode operation in the travel lane recognition control system will be described below based on FIGS. 10 to 12.

Figure 10:
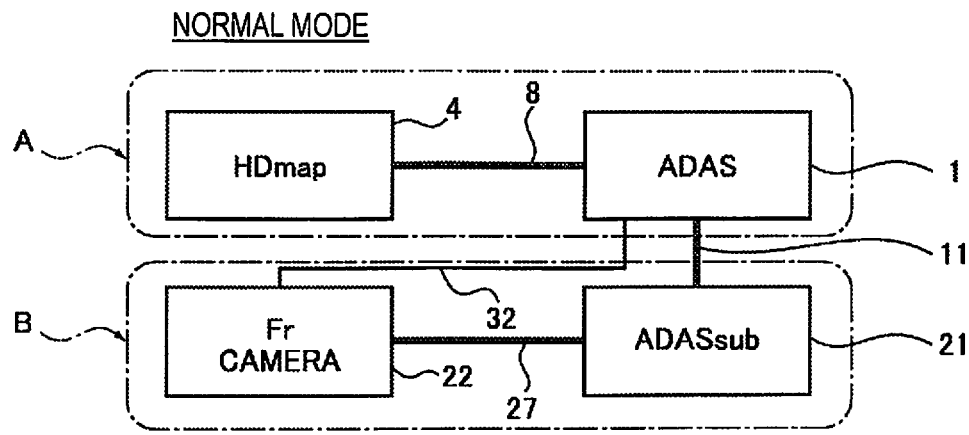
FIG. 10 is an operation explanatory view illustrating a normal mode of a travel lane recognition control system that shares a travel lane recognition operation function of a host vehicle.

As shown in FIG. 10, the first controller group A has, as the travel lane recognition control system, the ADAS controller 1 and the HDmap controller 4 that recognizes the travel lane of the host vehicle based on the host vehicle position and a high-precision map. As shown in FIG. 10, the second controller group B has, as the travel lane recognition control system, the ADAS sub-controller 21 and the FrCAMERA controller 22 that recognizes the travel lane of the host vehicle based on host vehicle forward imaging information from the front camera. The HDmap controller 4 corresponds to the first travel lane recognition controller, and the FrCAMERA controller 22 corresponds to the second travel lane recognition controller.

As shown in FIG. 10, in the normal mode of the travel lane recognition control system, the ADAS controller 1, the HDmap controller 4, the ADAS sub-controller 21, and the FrCAMERA controller 22 are all used to share the travel lane recognition operation function.

It will be assumed that a failure has occurred in the travel lane recognition control system provided in the second controller group B. Here, "failure in the travel lane recognition control system in the second controller group B" includes not only failures of the ADAS sub-controller 21 and the FrCAMERA controller 22 themselves, but also connector failures, communication failures, actuator failures, and the like. That is, it includes all causes that may result in a malfunction of the travel lane recognition operation function in the second controller group B.

Figure 11:
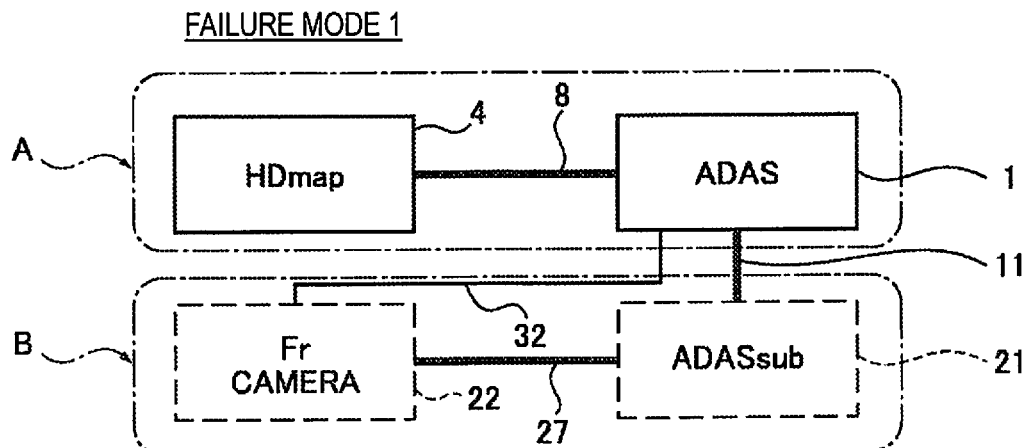
FIG. 11 is an operation explanatory view illustrating a failure mode 1 in the travel lane recognition control system.

In this case, as shown in FIG. 11, the failure mode 1 is executed, in which the ADAS controller 1 and the HDmap controller 4 included in the first controller group A, which is the normal controller group, are used to back up the travel lane recognition operation function that is lost due to the failure.

It will be assumed that a failure has occurred in the travel lane recognition control system provided in the first controller group A. Here, "failure in the travel lane recognition control system in the first controller group A" includes not only failures of the ADAS controller 1 and the HDmap controller 4 themselves, but also connector failures, communication failures, actuator failures, and the like. That is, it includes all causes that may result in a malfunction of the travel lane recognition operation function in the first controller group A.

Figure 12:
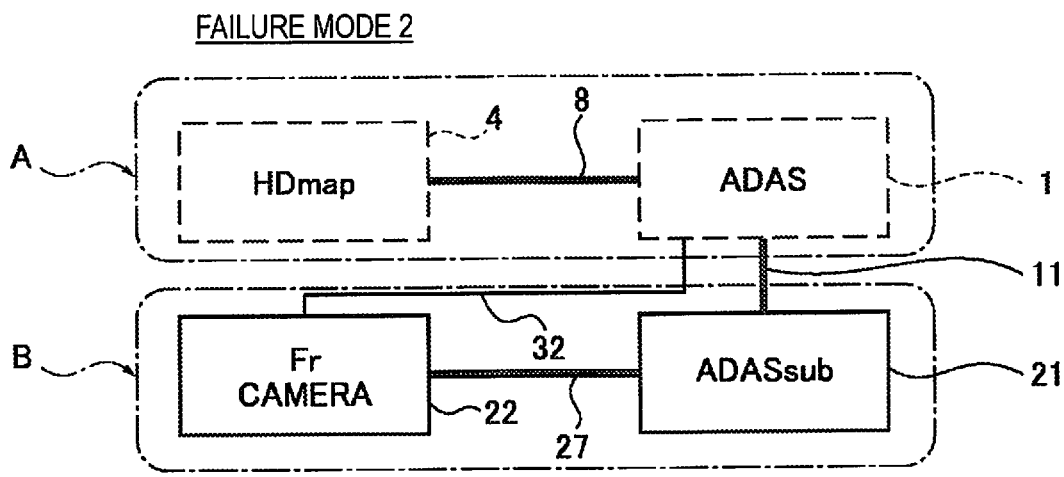
FIG. 12 is an operation explanatory view illustrating a failure mode 2 in the travel lane recognition control system.

In this case, as shown in FIG. 12, the failure mode 2 is executed, in which the ADAS sub-controller 21 and the FrCAMERA controller 22 included in the second controller group B, which is the normal controller group, are used to back up the travel lane recognition operation function that is lost due to the failure.

Normal/Failure Mode Operation in the Forward Obstacle Recognition Control System The normal/failure mode operation in the forward obstacle recognition control system will be described below based on FIGS. 13 to 15.

Figure 13:
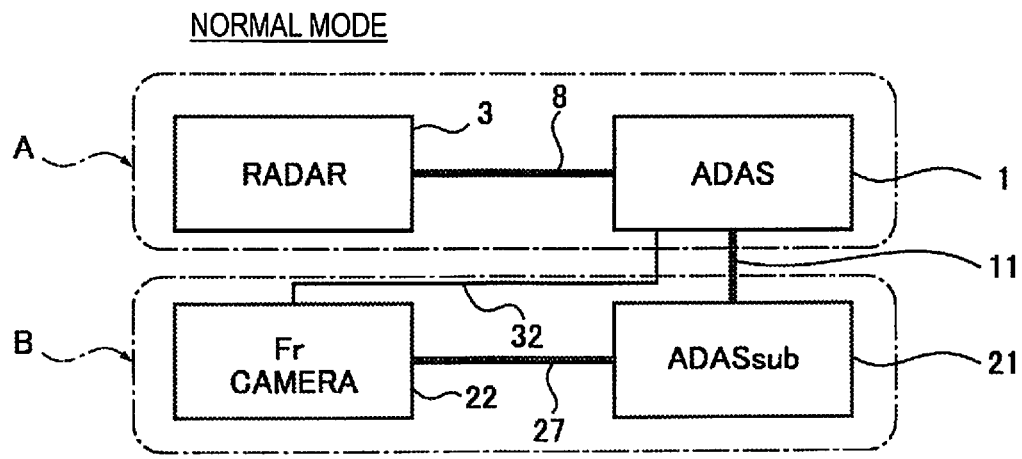
FIG. 13 is an operation explanatory view illustrating a normal mode of a forward obstacle recognition control system that shares a forward obstacle recognition operation function of the host vehicle.

As shown in FIG. 13, the first controller group A has, as a forward obstacle recognition control system, the ADAS controller 1 and the RADAR controller 3 that recognizes obstacles ahead of the host vehicle based on radar information from the front radar. As shown in FIG. 13, the second controller group B has, as the forward obstacle recognition control system, the ADAS sub-controller 21 and the FrCAMERA controller 22 that recognizes obstacles ahead of the host vehicle based on host vehicle forward imaging data from the front camera. The RADAR controller 3 corresponds to the first forward obstacle recognition controller, and the FrCAMERA controller 22 corresponds to the second forward obstacle recognition controller.

As shown in FIG. 13, in the normal mode of the forward obstacle recognition control system, all of the ADAS controller 1, the RADAR controller 3, the ADAS sub-controller 21, and the FrCAMERA controller 22 are used to share the forward obstacle recognition operation function.

It will be assumed that a failure has occurred in the forward obstacle recognition control system provided in the second controller group B. Here, "failure in the forward obstacle recognition control system in the second controller group B" includes not only failures of the ADAS sub-controller 21 and the FrCAMERA controller 22 themselves, but also connector failures, communication failures, actuator failures, and the like. That is, it includes all causes that may result in a malfunction of the forward obstacle recognition operation function in the second controller group B.

Figure 14:
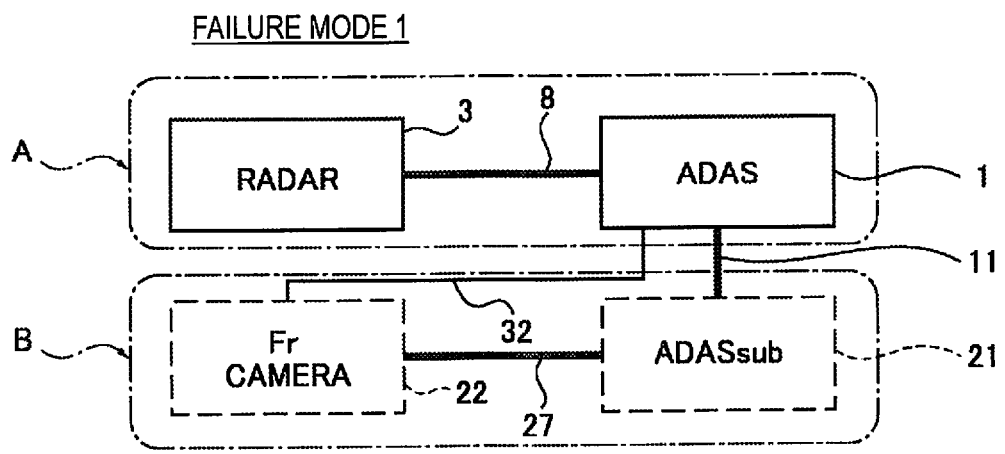
FIG. 14 is an operation explanatory view illustrating a failure mode 1 in the forward obstacle recognition control system.

In this case, as shown in FIG. 14, the failure mode 1 is executed, in which the ADAS controller 1 and the RADAR controller 3 included in the first controller group A, which is the normal controller group, are used to back up the forward obstacle recognition operation function that is lost due to the failure.

It will be assumed that a failure has occurred in the forward obstacle recognition control system provided in the first controller group A. Here, "failure in the forward obstacle recognition control system in the first controller group A" includes not only failures of the ADAS controller 1 and the RADAR controller 3 themselves, but also connector failures, communication failures, actuator failures, and the like. That is, it includes all causes that may result in a malfunction of the forward obstacle recognition operation function in the first controller group A.

Figure 15:
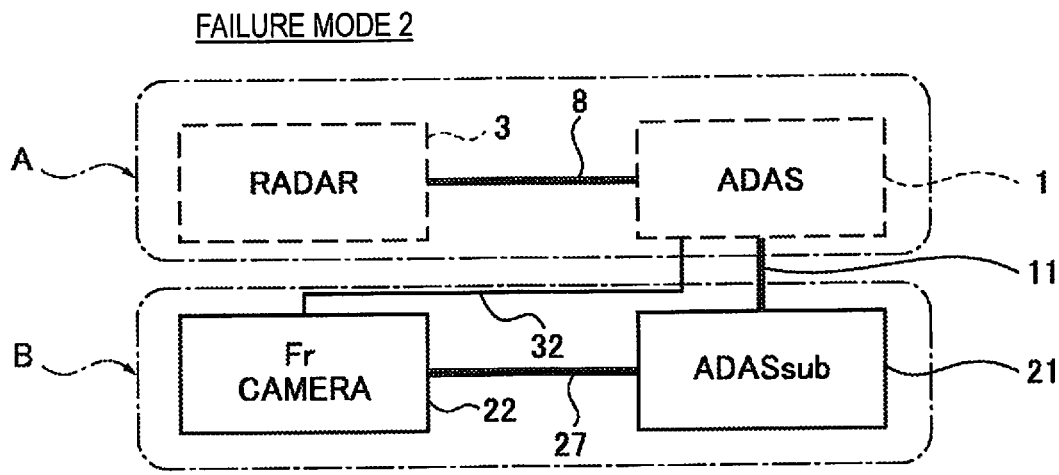
FIG. 15 is an operation explanatory view illustrating a failure mode 2 in the forward obstacle recognition control system.

In this case, as shown in FIG. 15, the failure mode 2 is executed, in which the ADAS sub-controller 21 and the FrCAMERA controller 22 included in the second controller group B, which is the normal controller group, are used to back up the forward obstacle recognition operation function that is lost due to the failure.

Normal/Failure Mode Operation in the Lateral Obstacle Recognition Control System The normal/failure mode operation in the lateral obstacle recognition control system will be described below based on FIGS. 16 to 18.

Figure 16:
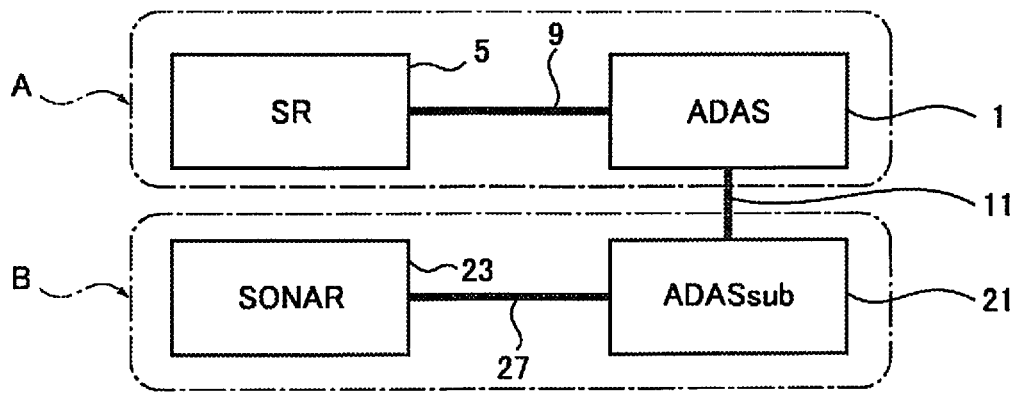
FIG. 16 is an operation explanatory view illustrating a normal mode of a lateral obstacle recognition control system that shares a lateral obstacle recognition operation function of the host vehicle.

As shown in FIG. 16, the first controller group A has, as the lateral obstacle recognition control system, the ADAS controller 1 and the SR controller 5 that recognizes obstacles on the sides of the host vehicle based on radar information from the side radars. As shown in FIG. 16, the second controller group B has, as the lateral obstacle recognition control system, the ADAS sub-controller 21 and the SONAR controller 23 that recognizes obstacles on the sides of the host vehicle, based on sonar information from the sonars. The SR controller 5 corresponds to the first lateral obstacle recognition controller and the SONAR controller 23 corresponds to the second lateral obstacle recognition controller.

As shown in FIG. 16, in the normal mode of the lateral obstacle recognition control system, the ADAS controller 1, the SR controller 5, the ADAS sub-controller 21, and the SONAR controller 23 are all used to share the lateral obstacle recognition operation function.

It will be assumed that a failure has occurred in the lateral obstacle recognition control system provided in the second controller group B. Here, "failure in the lateral obstacle recognition control system in the second controller group B" includes not only failures of the ADAS sub-controller 21 and the SONAR controller 23 themselves, but also connector failures, communication failures, actuator failures, and the like. That is, it includes all causes that may result in a malfunction of the lateral obstacle recognition operation function in the second controller group B.

Figure 17:
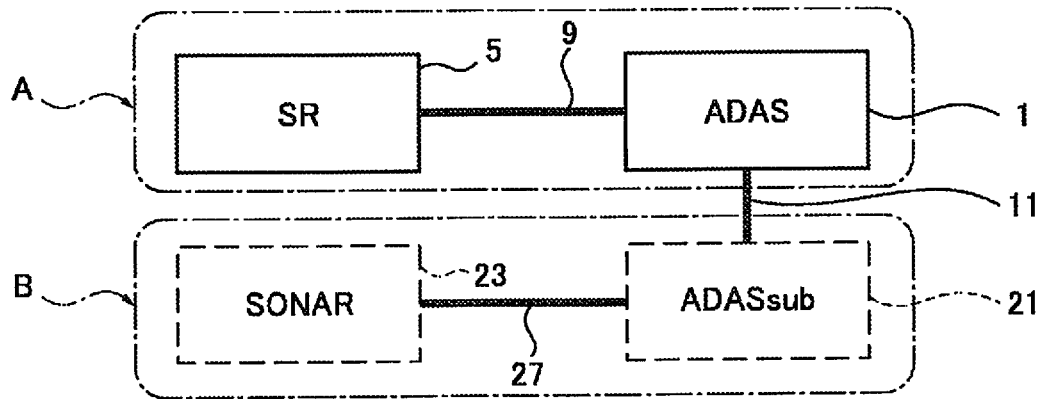
FIG. 17 is an operation explanatory view illustrating a failure mode 1 in the lateral obstacle recognition control system.

In this case, as shown in FIG. 17, failure mode 1 is executed, in which the ADAS controller 1 and the SR controller 5 included in the first controller group A, which is the normal controller group, are used to back up the lateral obstacle recognition operation function that is lost due to the failure.

It will be assumed that a failure has occurred in the lateral obstacle recognition control system provided in the first controller group A. Here, "failure in the lateral obstacle recognition control system in the first controller group A" includes not only failures of the ADAS controller 1 and the SR controller 5 themselves, but also connector failures, communication failures, actuator failures, and the like. That is, it includes all causes that may result in a malfunction of the lateral obstacle recognition operation function in the first controller group A.

Figure 18:
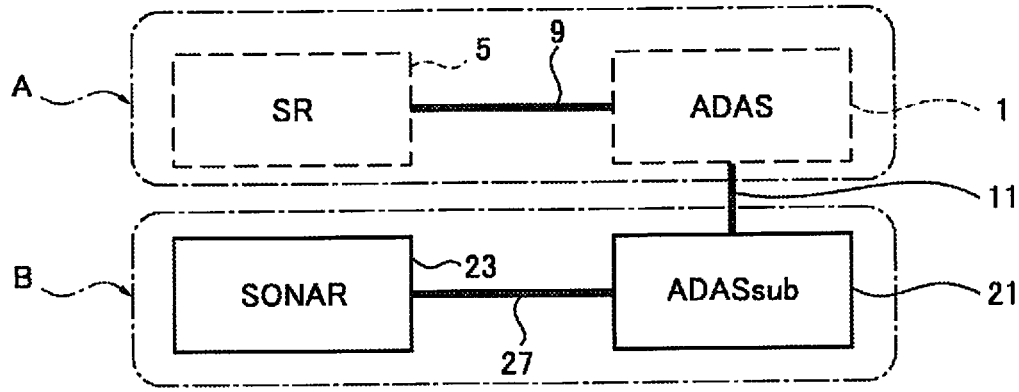
FIG. 18 is an operation explanatory view illustrating a failure mode 2 in the lateral obstacle recognition control system.

In this case, as shown in FIG. 18, failure mode 2 is executed, in which the ADAS sub-controller 21 and the SONAR controller 23 included in the second controller group B, which is the normal controller group, are used to back up the lateral obstacle recognition operation function that is lost due to the failure.

As described above, the following effects are exhibited with the control method and the control system for an autonomous driving vehicle according to the first embodiment.

(1) A method for controlling a driving assisted vehicle provided with a plurality of controllers 1-7, 21-26 that share operation functions in a driving assist control, comprising: dividing a plurality of controllers 1-7, 21-26 into a plurality of controller groups (first controller group A, second controller group B) to construct a network topology, based on an architecture that realizes equivalent operation functions with each controller group, determining whether a failure has occurred in any one of the plurality of controllers 1-7, 21-26, sending failure information to a normal controller group other than a failed controller group to which the failed controller belongs via a network communication line upon determining that a failure has occurred in any one of the plurality of controllers 1-7, 21-26, and executing a failure mode for backing up the operation function of the failed controller group by the controllers constituting the normal controller group, when the normal controller group receives the failure information via the network communication line (FIG. 1). As a result, it is possible to provide a control method that realizes an operation function that is equivalent to the operation function that is lost due to the failure when a failure occurs in any one of the plurality of on-board controllers 1-7, 21-26 without making the control system configuration redundant. That is, based on an architecture that realizes equivalent operation functions with each controller group, for example, a plurality of controllers 1-7, 21-26 are divided into the first controller group A and the second controller group B. For this reason, the divided first controller group A and the second controller group B have a relationship in which either controller group backs up the operation functions of the other in preparation for a failure.

(2) Upon determining that a failure has not occurred in any of the plurality of controllers 1-7, 21-26, normal mode is executed, in which the operation functions are realized using all of the plurality of controllers (FIG. 1). For this reason, it is possible to use a simple control system configuration that does not include control system elements that are not used when realizing operation functions that are required when controlling in the normal mode. That is, if the control system configuration has a redundant configuration, it would include control system elements that are not used when realizing operation functions that are required when controlling in the normal mode. That is, executing the normal mode using all of the plurality of controllers supports the fact that it does not have a redundant configuration in which a plurality of control system elements that realize the same operation functions are prepared.

(3) The plurality of controllers 1-7, 21-26 are divided into a first controller group A and a second controller group B to construct a network topology, and network communication lines/power sources of the first controller group A and the second controller group B are electrically and physically independent (FIG. 1). Therefore, when a failure mode is executed by using the controllers included in the normal controller group, the failure mode that backs up the operation function that is lost due to the failure can be executed without being affected by the controller group to which the failed controller belongs. That is, the electric and physical independence of the network communication lines/power sources of the first controller group A and the second controller group B are ensured.

Figure 3:
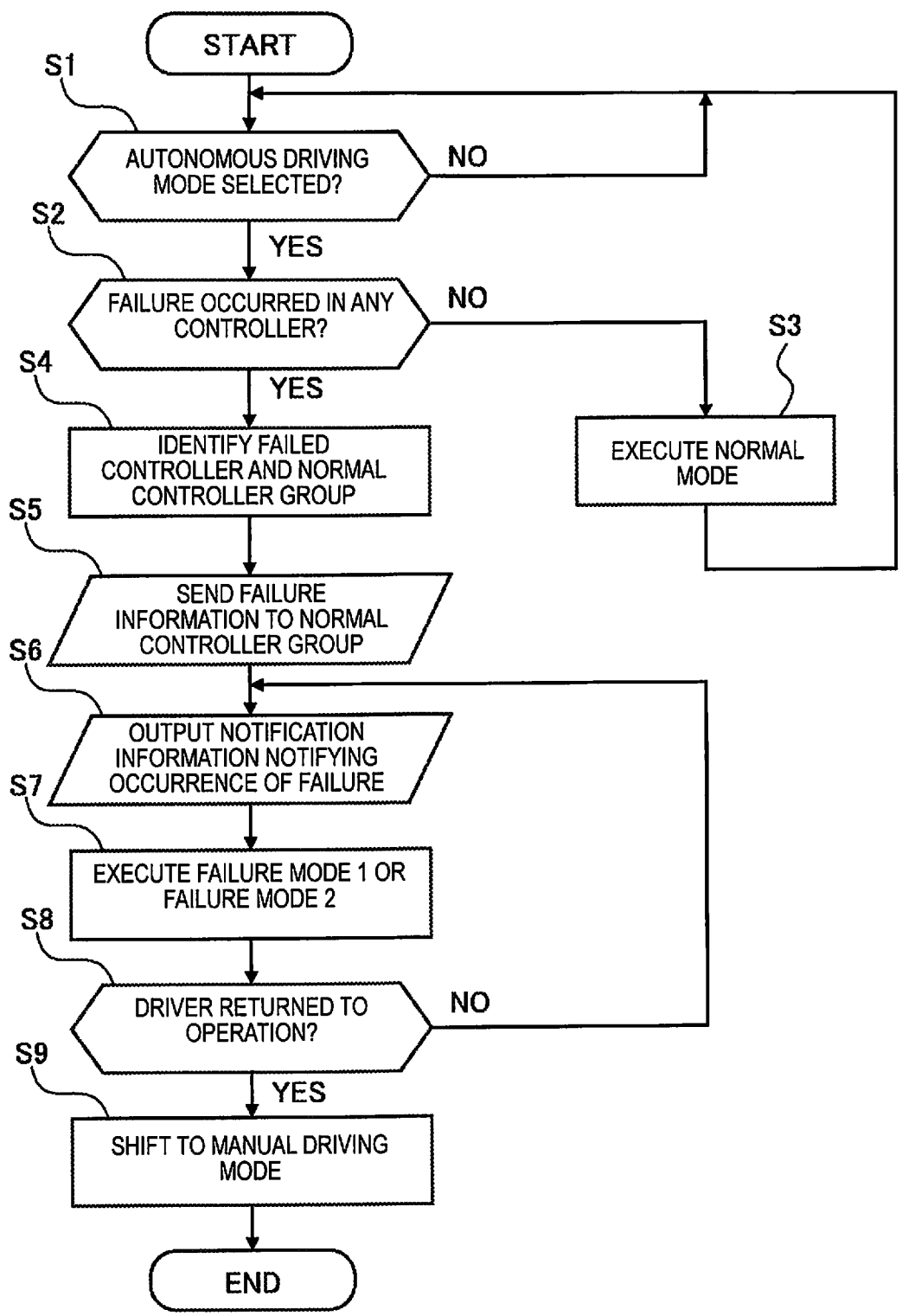
FIG. 3 is a flow chart illustrating a flow of a fail-safe control operation that is executed by the control system according to the first embodiment when an autonomous driving mode is selected.

(4) The driving assisted vehicle is an autonomous driving vehicle that realizes at least autonomous driving in a single lane when autonomous driving mode is selected, the plurality of controllers 1-7, 21-26 are controllers that share an actuator operation function and a host vehicle periphery recognition operation function in the autonomous driving control, when an autonomous driving mode is selected, it is determined whether a failure has occurred in any one of the plurality of controllers 1-7, 21-26, upon determining that a failure has occurred, failure information is sent to a normal controller group to which the failed controller does not belong via a network communication line, and notification information, which notifies the driver that a failure has occurred, is output, and when the normal controller group receives the failure information via the network communication line, the controllers constituting the normal controller group executes a failure mode for backing up the operation function of the failed controller group, until the driver returns to the operation (FIG. 3). For this reason, when there is a failure in one controller responsible for a required operation function when the autonomous driving mode is selected, it is possible to realize an operation function that is equivalent to the operation function that is lost due to the failure, from when the failure occurs until the driver returns to the operation. That is, in the case of an autonomous driving vehicle, the ultimate fail-safe operation is manual operation by the driver. Therefore, in the failure mode when the autonomous driving mode is selected, it is sufficient if an operation function that is equivalent to the operation function that is lost due to the failure can be realized, from when the failure occurs until the operation is handed over to the manual operation by the driver.

(5) A steering control system of the autonomous driving vehicle is provided with a first steering controller (the first steering controller 7) that is included in the first controller group A and that controls a first steering actuator (the first steering motor 51), and a second steering controller (the second steering controller 26) that is included in the second controller group B and that controls a second steering actuator (the second steering motor 52), wherein if the operation function that is lost due to the failure is a steering actuator operation function, of the first steering controller (the first steering controller 7) and the second steering controller (the second steering controller 26), the controller included in the normal controller group is used to execute a failure mode for backing up the lost operation function (FIGS. 4-6). For this reason, if there is a failure in one controller responsible for the steering actuator operation function, it is possible to use the controller included in the normal controller group of the two controller groups A, B, to thereby realize the equivalent operation function as the lost steering actuator operation function.

(6) A brake control system of the autonomous driving vehicle is provided with a first brake controller (the brake controller 6) that is included in the first controller group A and that controls a first brake actuator (the electric booster 53), and a second brake controller (the VDC controller 24, the E-PKB controller 25) that is included in the second controller group B and that controls a second brake actuator (the brake fluid pressure actuator 54, the PKB actuator 55), wherein if the operation function that is lost due to the failure is a brake actuator operation function, of the first brake controller (the brake controller 6) and the second brake controller (the VDC controller 24, the E-PKB controller 25), the controller included in the normal controller group is used to execute a failure mode for backing up the lost operation function (FIGS. 7-9). For this reason, if there is a failure in one controller responsible for the brake actuator operation function, it is possible to use the controller included in the normal controller group of the two controller groups A, B, to thereby realize the equivalent operation function as the brake actuator operation function.

(7) A host vehicle peripheral recognition system of the autonomous driving vehicle is provided with a first travel lane recognition controller (HDmap controller 4) that is included in the first controller group A and that recognizes a travel lane of the host vehicle based on a host vehicle position and a high-precision map, and a second travel lane recognition controller (the FrCAMERA controller 22) that is included in the second controller group B and that recognizes the travel lane of the host vehicle based on host vehicle forward imaging information from a front camera, wherein if the operation function that is lost due to the failure is a travel lane recognition operation function of the host vehicle, of the first travel lane recognition controller (the HDmap controller 4) and the second travel lane recognition controller (the FrCAMERA controller 22), the controller included in the normal controller group is used to execute a failure mode for backing up the lost operation function (FIGS. 10-12). For this reason, if there is a failure in one controller responsible for the travel lane recognition operation function, it is possible to use the controller included in the normal controller group of the two controller groups A, B, to thereby realize the equivalent operation function as the travel lane recognition operation function.

(8) A host vehicle peripheral recognition system of the autonomous driving vehicle is provided with a first forward obstacle recognition controller (the RADAR controller 3) that is included in the first controller group A and that recognizes a forward obstacle of the host vehicle based on radar information from the front radar, and a second forward obstacle recognition controller (the FrCAMERA controller 22) that is included in the second controller group B and that recognizes the forward obstacle of the host vehicle based on host vehicle forward imaging data from a front camera, wherein if the operation function that is lost due to the failure is a forward obstacle recognition operation function of the host vehicle, of the first forward obstacle recognition controller (the RADAR controller 3) and the second forward obstacle recognition controller (the FrCAMERA controller 22), the controller included in the normal controller group is used to execute a failure mode for backing up the lost operation function (FIGS. 13-15). For this reason, when there is a failure in one controller responsible for the forward obstacle recognition operation function, it is possible to use the controller included in the normal controller group of the two controller groups A, B, to thereby realize the equivalent operation function as the forward obstacle recognition operation function.

(9) A host vehicle peripheral recognition system of the autonomous driving vehicle is provided with a first lateral obstacle recognition controller (the SR controller 5) included in the first controller group A and that recognizes a lateral obstacle of the host vehicle based on radar information from the side radars, and a second lateral obstacle recognition controller (the SONAR controller 23) included in the second controller group B and that recognizes lateral obstacles of the host vehicle based on sonar information from the sonars, and if the operation function that is lost due to the failure is a lateral obstacle recognition operation function of the host vehicle, of the first lateral obstacle recognition controller (the SR controller 5) and the second lateral obstacle recognition controller (the SONAR controller 23), the controller included in the normal controller group is used to execute a failure mode for backing up the lost operation function (FIGS. 16-18). For this reason, when there is a failure in one controller responsible for the lateral obstacle recognition operation function, it is possible to use the controller included in the normal controller group of the two controller groups A, B, to thereby realize the equivalent operation function as the lateral obstacle recognition operation function.

(10) A control system for a driving assisted vehicle provided with a plurality of controllers 1-7, 21-26 that share operation functions in a driving assist control, in which a plurality of controllers 1-7, 21-26 are divided into a plurality of controller groups (the first controller group A, the second controller group B) to construct a network topology, based on an architecture that realizes equivalent operation functions with each controller group, comprising: failure determination units 1a, 21a for determining whether a failure has occurred in any one of the plurality of controllers 1-7, 21-26, failure information transmission units 1b, 21b for sending failure information to a normal controller group other than a failed controller group to which the failed controller belongs via a network communication line upon determining that a failure has occurred in any one of the plurality of controllers 1-7, 21-26, and fail-safe control units 1c, 21c for executing a failure mode for backing up the operation function of the failed controller group by the controllers constituting the normal controller group, when the normal controller group receives the failure information via the network communication line (FIG. 2). As a result, it is possible to provide a control system that realizes an operation function that is equivalent to the operation function that is lost due to the failure when a failure occurs in any one of the plurality of controllers 1-7, 21-26 installed in a vehicle, without making the control system configuration redundant.

The control method and the control system for a driving assisted vehicle according to the present disclosure have been described above based on the first embodiment. However, specific configurations are not limited to this first embodiment, and various modifications and additions to the design can be made without departing from the scope of the invention according to each claim in the Claims.

In the first embodiment, an example was presented in which, based on an architecture that realizes equivalent operation functions with each controller group, a plurality of on-board controllers are divided into the first controller group A and the second controller group B to construct a network topology. However, a plurality of on-board controllers may be partially or entirely divided into three or more controller groups in accordance with the operation functions and requirements, to construct a network topology.

In the first embodiment, the failure determination unit 1a, the failure information transmission unit 1b, and the fail-safe control unit 1c are provided in the ADAS controller 1 as a fail-safe control system configuration. Similarly, the ADAS sub-controller 21 includes the failure determination unit 21a, the failure information transmission unit 21b, and the fail-safe control unit 21c. However, the fail-safe control system configuration may be that a fail-safe controller is provided in the first controller group separately from the ADAS controller, and a fail-safe controller may be provided in the second controller group separately from the ADAS sub-controller. In addition, as the fail-safe control system configuration, a fail-safe controller may be provided independently of the first controller group and the second controller group.

In the first embodiment, an example was presented in which controllers 1-7, 21-26 that share an actuator operation function and a host vehicle periphery recognition operation function in the autonomous driving control are installed in the vehicle as the plurality of controllers. However, in addition to the actuator operation function and the host vehicle periphery recognition operation function in the driving assist control, controllers that share a vehicle speed recognition operation function, display operation function, and the like, may also be installed in the vehicle as the plurality of controllers.

In the first embodiment, examples were presented in which the steering actuator operation function and the brake actuator operation function are backed up, and the travel lane/forward obstacle/lateral obstacle recognition operation functions are backed up, as the fail-safe control. However, with the addition of on-board controllers, the vehicle speed recognition operation function may also be backed up, or the display operation function may also be backed up, as the fail-safe control.

In the first embodiment, an example was presented in which the control method and the control system of the present disclosure are applied to an autonomous driving vehicle that is an electrically driven vehicle (a hybrid vehicle or an electric vehicle) that realizes single-lane autonomous driving on a dedicated road for automobiles. However, the control method and the control system of the present disclosure may, of course, be applied to an autonomous driving vehicle having a higher level of autonomous driving. In addition, they may also be applied to a driving assisted vehicle equipped with an emergency brake system, an ACC system, or the like. Furthermore, they may be applied not only to electrically driven vehicle, but also to engine-powered vehicles.

The invention claimed is:

1. A driving assisted vehicle control method for controlling a driving assisted vehicle including at least a first controller group and a second controller group, the first controller group including a plurality of first controllers and the second controller group including a plurality of second controllers, the first controller group and the second controller group sharing operation functions in a driving assist control, the operation functions including an actuator operation function and a host vehicle periphery recognition operation function in the driving assist control, the first controller group and the second controller group being configured to construct a network topology in which each of the first controllers is configured to back up an operation function of one of the second controllers and each of the second controllers is configured to back up an operation function of one of the first controllers, one first controller of the first controller group and one second controller of the second controller group being configured to execute a fail-safe control operation, the driving assisted vehicle control method comprising
using the one first controller and the one second controller to execute the fail-safe control operation,
the fail-safe control operation including
using the one first controller to determine whether a failure has occurred in any one of the first controllers,
upon determining that a failure has occurred in any one of the first controllers, sending failure information to the one second controller via a network communication line,
upon receiving the failure information via the network communication line, the one second controller executing a second failure mode for backing up the operation function that is lost due to the failure in the first controller group by using the second controllers until a driver returns to operation of the driving assisted vehicle,
using the one second controller to determine whether a failure has occurred in any one of the second controllers,
upon determining that a failure has occurred in any one of the second controllers, sending failure information to the one first controller via a network communication line, and
upon receiving the failure information via the network communication line, the one first controller executing a first failure mode for backing up the operation function that is lost due to the failure in the second controller group by using the first controllers until the driver returns to the operation of the driving assisted vehicle.

2. The driving assisted vehicle control method according to claim 1, wherein
upon determining that a failure has not occurred in any of the plurality of on-board controllers, executing a normal mode in which the operation functions are realized using all of the plurality of first controllers and the plurality of second controllers.

3. The driving assisted vehicle control method according to claim 1, wherein
network communication lines or power sources of the first controller group and the second controller group are electrically or physically independent.

4. The driving assisted vehicle control method according to claim 3, wherein
the driving assisted vehicle is an autonomous driving vehicle that realizes at least autonomous driving in a single lane when an autonomous driving mode is selected,
the actuator operation function and the host vehicle periphery recognition operation function are operation functions executed in the autonomous driving control,
the fail-safe control operation is executed when an autonomous driving mode is selected
the fail-safe control operation further includes transmitting notification information to notify the driver that a failure has occurred upon determining that the failure has occurred in any one of the first controllers or any one of the second controllers.

5. The driving assisted vehicle control method according to claim 4, wherein
a steering control system of the autonomous driving vehicle is provided with a first steering controller and a second steering controller, the first steering controller being included in the first controller group and configured to control a first steering actuator and the second steering controller being included in the second controller group and configured to control a second steering actuator, and
when the operation function that is lost due to the failure is a steering actuator operation function of one of the first steering controller and the second steering controller, the other of the first steering controller and the second steering controller is used to execute the first failure mode or the second failure mode for backing up the operation function that is lost.

6. The driving assisted vehicle control method according to claim 4, wherein a brake control system of the autonomous driving vehicle is provided with a first brake controller and a second brake controller, the first brake controller being included in the first controller group and configured to control a first brake actuator and the second brake controller being included in the second controller group and configured to control a second brake actuator, and when the operation function that is lost due to the failure is a brake actuator operation function of one of the first brake controller and the second brake controller, the other of the first brake controller and the second brake controller is used to execute the first failure mode or the second failure mode for backing up the operation function that is lost.

7. The driving assisted vehicle control method according to claim 4, wherein a host vehicle peripheral recognition system of the autonomous driving vehicle is provided with a first travel lane recognition controller and a second travel lane recognition controller, the first travel lane recognition controller being included in the first controller group and configured to recognize a travel lane of the host vehicle based on a host vehicle position and a high-precision map and the second travel lane recognition controller being included in the second controller group and configured to recognize the travel lane of the host vehicle based on host vehicle forward imaging information from a front camera, and when the operation function that is lost due to the failure is a travel lane recognition operation function of one of the first travel lane recognition controller and the second travel lane recognition controller, the other of the first travel lane recognition controller and the second travel lane recognition controller is used to execute the first failure mode or the second failure mode for backing up the operation function that is lost.

8. The driving assisted vehicle control method according to claim 4, wherein a host vehicle peripheral recognition system of the autonomous driving vehicle is provided with a first forward obstacle recognition controller and a second forward obstacle recognition controller, the first forward obstacle recognition controller being included in the first controller group and configured to recognize a forward obstacle of the host vehicle based on radar information from the front radar and the second forward obstacle recognition controller being included in the second controller group and configured to recognize the forward obstacle of the host vehicle based on host vehicle forward imaging data from a front camera, and when the operation function that is lost due to the failure is a forward obstacle recognition operation function of one of the first forward obstacle recognition controller and the second forward obstacle recognition controller, the other of the first forward obstacle recognition controller and the second forward obstacle recognition controller is used to execute failure mode for backing up the operation function that is lost.

9. The driving assisted vehicle control method according to claim 4, wherein a host vehicle peripheral recognition system of the autonomous driving vehicle is provided with a first lateral obstacle recognition controller and a second lateral obstacle recognition controller, the first lateral obstacle recognition controller being included in the first controller group and configured to recognize a lateral obstacle of the host vehicle based on radar information from a side radar and the second lateral obstacle recognition controller being included in the second controller group and configured to recognize lateral obstacles of the host vehicle based on sonar information from a sonar, and when the operation function that is lost due to the failure is a lateral obstacle recognition operation function of one of the first lateral obstacle recognition controller and the second lateral obstacle recognition controller, the other of the first lateral obstacle recognition controller and the second lateral obstacle recognition controller is used to execute the first failure mode or the second failure mode for backing up the operation function that is lost.

10. A driving assisted vehicle control system for a driving assisted vehicle including at least a first controller group and a second controller group, the first controller group including a plurality of first controllers and the second controller group including a plurality of second controllers, the first controller group and the second controller group sharing operation functions in a driving assist control, the operation functions including an actuator operation function and a host vehicle periphery recognition operation function in the driving assist control, the first controller group and the second controller group being configured to construct a network topology in which each of the first controllers is configured to back an operation function of one of the second controllers and each of the second controllers is configured to back up an operation function of one of the first controllers, the driving assisted vehicle control system comprising:

one first controller of the first controller group; and one second controller of the second controller group, the one first controller being configured to determine whether a failure has occurred in any one of the first controllers, and the one second controller via a network communication line upon determining that a failure has occurred in any one of the first controllers, the one second controller being configured to determine whether a failure has occurred in any one of the second controllers, and send failure information to the one first controller via the network communication line upon determining that a failure has occurred in any one of the second controllers, the one first controller being further configured to execute a first failure mode for backing up the operation function that is lost due to the failure in the second controller group using the plurality of first controllers until a driver returns to operation of the driving assisted vehicle, upon receiving the failure information from the one second controller via the network communication line, and the one second controller being further configured to
execute a second failure mode for backing up the operation function that is lost due to the failure in the first controller group using the plurality of second controllers until the driver returns to the operation of the driving assisted vehicle, upon receiving the failure information from the one first controller via the network communication line.

\* \* \* \* \*